US007284868B2

(12) United States Patent
Colpaert et al.

(10) Patent No.: US 7,284,868 B2
(45) Date of Patent: Oct. 23, 2007

(54) COMPACT PROJECTION SYSTEMS USING MULTIPLE LIGHT SOURCES

(75) Inventors: Chris Colpaert, Lovendegem (BE); Kris Jacques Vandorpe, Beveren-Leie (BE); Saskia Galle, Markegem (BE); Stefan Leeschaeve, Oudenaarde (BE)

(73) Assignee: Barco N.V., Kortrijk (BE)

( * ) Notice: Subject to any disclaimer, the term of this patent is extended or adjusted under 35 U.S.C. 154(b) by 229 days.

(21) Appl. No.: 11/037,008

(22) Filed: Jan. 19, 2005

(65) Prior Publication Data

US 2005/0157275 A1    Jul. 21, 2005

Related U.S. Application Data (60) Provisional application No. 60/537,594, filed on Jan. 20, 2004.

(51) Int. Cl.
  *G03B 1/00*   (2006.01)
  *G03B 21/14*  (2006.01)
  *G03B 21/26*  (2006.01)

(52) U.S. Cl. .............................. 353/97; 353/88; 353/30

(58) Field of Classification Search .................. 353/97, 353/85, 98, 102, 30, 31, 94, 88, 84
See application file for complete search history.

(56) References Cited

U.S. PATENT DOCUMENTS 3,693,515 A * 9/1972 Baker .......................... 396/558
5,597,223 A    1/1997 Watanabe et al.
5,924,783 A *  7/1999 Jones .......................... 353/97
6,666,558 B1  12/2003 Yamagishi
2002/0126264 A1  9/2002 Dewald et al.
2002/0149750 A1  10/2002 Kane
2004/0070842 A1*  4/2004 Bierhuizen .................. 359/641
2004/0090602 A1*  5/2004 Imade ......................... 353/102
2004/0150794 A1*  8/2004 Kurtz et al. .................. 353/31
2005/0073659 A1*  4/2005 Sannohe et al. .............. 353/56
2005/0128436 A1*  6/2005 Matsui ........................ 353/31

FOREIGN PATENT DOCUMENTS

| EP | 0 683 425 | 11/1995 |
|---|---|---|
| EP | 1 111 445 | 6/2001 |
| WO | WO 02/084339 | 10/2002 |

* cited by examiner

*Primary Examiner*—Melissa Jan Koval
*Assistant Examiner*—Andrew Kong
(74) *Attorney, Agent, or Firm*—Bacon & Thomas, PLLC (57) ABSTRACT

The invention relates to a projection system using multiple light sources (1) at the same time. The projection system (100) comprises multiple light sources (1), a lens array system for each of the light sources (1), a condenser lens (2), an aperture means (3), a light valve assembly and a projection lens (5) to project an image. The light sources are adapted to each simultaneously illuminate the whole light valve assembly. In one aspect, the invention relates to a system and methods for allowing separately control of brightness, contrast, dichroic color shift or beam uniformity. This controlling or adjustment is performed by controlling and/or adjusting the cross-section of the illumination beam of each of the multiple light sources near the aperture of the aperture means.

22 Claims, 10 Drawing Sheets

COMPACT PROJECTION SYSTEMS USING MULTIPLE LIGHT SOURCES

This benefit of Provisional Application No. 60/537,594 filed Jan. 20, 2004, is claimed under 35 U.S.C. § 119(e) and said provisional application is incorporated herein by reference.

The present invention relates to the field of projection systems for projecting images. More specifically, the invention relates to a high power illumination system for a projector using transmissive or reflective light valves as well as methods of operating the same.

BACKGROUND OF THE INVENTION

Large-screen, high-brightness electronic projection display apparatuses serve different broad areas of application such as e.g. electronic presentations for business, education, advertising, entertainment, simulation and status and information.

In order to fulfil the high brightness requirements of the present projection systems, a light source with a high level of power is needed. This often prevents formation of a compact projection display apparatus.

In projection systems, typically lamps having a power of 250 W are used. Increase of the luminous flux can either be performed by raising the power level of the lamp without changing the internal structure of the lamp, which leads to fast deterioration of the lamp such that the lifetime of the lamp is significantly shortened, or by changing the internal structure of the lamp, i.e. increasing the length of the luminous element, which leads to a significant increase of the size of the lamp, thereby limiting the compactness of the projection system. None of these solutions allows to obtain a compact and durable projection system.

In European Patent Application EP0683425 A1, a multiple lamp solution for projection systems is described. In the application, a projection system is described having two or more lamps, a light transmitting optical system, a light valve and a projection lens. The lamps are arranged side by side and allow a more compact system. In a specific embodiment, the light transmitting optical system comprises multiple sets of lens arrays as optical integrators. The image from the lens arrays is focused on the light valve by way of an additional lens. Adjacent to the lamps, UV/IR filters are positioned to remove ultraviolet (UV) and/or infrared (IR) radiation out of the light path. Nevertheless, reflection of IR radiation back into the lamps leads to an increased deterioration of the lamps.

Furthermore, today's projection systems also suffer from lack of compactness of the projection systems as a whole. They also still do not allow an optimal illumination of the light valve, i.e. combining an optimum light output of the light sources onto the light valve with a reduction of the heat load of the light valve.

SUMMARY OF THE INVENTION

It is an object of the present invention to provide a multiple light source projection system and method of operating the same wherein the light output of the different light sources is used to obtain an improved projected image.

It is furthermore an object of the present invention to provide a multiple light source projection system and method of operating the same wherein both contrast and brightness can be adjusted independently.

It is an object of the present invention that an illumination of a light valve assembly can be optimized, i.e. that the illumination of the light valve assembly can be defined sharper as well as a method of achieving this.

It is also an object of the present invention to provide a multiple light source projection system and method of operating the same having an improved cooling of the light sources used.

The above objectives are accomplished by methods and devices according to the present invention.

The invention relates to a projection system for projecting an image, said projection system comprising a light valve assembly, at least two light sources and an aperture means, said at least two light sources adapted to each simultaneously illuminate the whole light valve assembly by emitting an illumination beam towards said aperture means, wherein said system comprises an adjustment means for adjusting, in or near the aperture means, a cross-section of said illumination beam of at least one of said light sources. Said aperture means may be determined by the presence of relay optics. In or near said aperture means may comprise in the aperture or substantially adjacent to the aperture means, i.e. in a corresponding area wherein the illumination is substantially similar to and has the same properties as the illumination in the aperture. Adjusting in the aperture means may be performed by adjusting the cross-section in the aperture, e.g. by positioning or moving a means in a slit in the aperture means or e.g. by tilting the aperture means. Adjusting in or near the aperture means may e.g. be performed by positioning or moving means adjacent the aperture means. Said aperture means may be an aperture plate having an aperture. In or near said aperture means, for each of said at least two light sources, said cross-section may not overlap with cross-sections of illumination beams of other of said light sources. Adjusting a cross-section in or near the aperture means may comprise changing the ratio of the area of the projections of the cross-sections of the illumination beams projected perpendicular to the average plane through an aperture of said aperture means to the area of said aperture of said aperture means. Adjusting a cross-section in or near the aperture means may comprise tilting said aperture means with respect to the optical axis of said system, so as to correct for a Scheimpflug effect of an image created at the light valve assembly. Said adjustment means may comprise a blocking means for blocking at least part of the cross-section of the illumination beam of at least one of said light sources. Said blocking means may be a high contrast plate. Said blocked part may be the part of the illumination beam with illumination rays having the smallest incident angles on the light valve assembly. Said adjustment means may comprise an adjustable illumination reducing means for reducing the illumination of the light valve assembly without changing the contrast. Said adjustable illumination reducing means may allow to block at least part of the illumination beam in or near the aperture means such that the average angle of incidence of illumination rays that reach the light valve assembly is substantially equal to the average angle of incidence of illumination rays that reach the light valve assembly without blocking part of the illumination. Said blocked part of the illumination beam may be such that equal portion of illumination rays with high angle of incidence on the light valve assembly and illumination rays with low angle of incidence on the light valve assembly are blocked. Said projection system may comprise splitting means for splitting said illumination beams in beams of different wavelength ranges, said beams of different wavelength ranges adapted for illuminating different light valve assemblies, wherein said adjustment means comprises means for reducing the amount of light of the illumination beams that are subject to a dichroic shift, said dichroic shift introduced by said means for splitting said illumination beams. Said means for reducing the amount of light of the illumination beam that is subject to a dichroic shift may comprise a means for blocking, in or near the aperture means, part of the illumination. Said adjustment means may comprise a rotating means for rotating said at least two light sources around the optical axis of said system. Said rotation may be a rotation around the optical axis of the relay optics. Said means for adjusting may comprise a diffuser, positioned close to but not at the aperture means. This may be done to avoid imaging of dust or dirt particles.

The invention also relates to a method for using a multiple light source projection system, said method comprising driving each of at least two light sources to create a light beam, condensing said light beams from each of said light sources in a single illumination beam, illuminating a light valve assembly with said single illumination beam, wherein said method further comprises, prior to illuminating a light valve assembly with said single illumination beam, adjusting in or near an aperture means a cross-section of said light beams of at least one of said light sources. Adjusting said cross-section of said light beams of at least one of said light sources may comprise tilting said aperture means with respect to the optical axis of said system, so as to correct for a Scheimpflug effect of an image created at the light valve assembly. Adjusting said cross-section of said light beams of at least one of said light sources may comprise blocking at least part of the cross-section of the light beam of at least one of said light sources. Said blocking may be performed to change the contrast or brightness of the image to be produced. The contrast or brightness may be changed independently. Said blocking at least part of the cross-section of the light beam of at least one of said light sources may comprise blocking said part of the light beam(s) comprising illumination rays having the smallest incident angles on the light valve assembly. Said blocking at least part of the cross-section of the light beam of at least one of said light sources may comprise blocking said part of the light beam(s) without changing the contrast. Said blocking at least part of the cross-section of the light beam of at least one of said light sources may comprise blocking part of the light beam(s) that is subject to a dichroic shift. Adjusting in or near an aperture means a cross-section of said light beams of at least one of said light sources may comprise rotating said at least two light sources around the optical axis of said system. This may be performed during production of the projection system.

Adjusting in or near an aperture means a cross-section of said light beams of at least one of said light sources may comprises diffusing at least part of a light beam of at least one of said light sources. The method may further comprise projecting said image from said illuminated light valve assembly using a projection lens.

The invention furthermore relates to a projection system for projecting an image. The projection system comprises a light valve assembly, at least two light sources generating some infrared light and adjusted to each illuminate the whole light valve assembly simultaneously. The projection system also comprises, for each of the light sources, a lens array system having a first lens array and a second lens array. The projection system furthermore comprises for each of the light sources an infrared radiation filtering means, positioned such that at least part of the infrared radiation emitted by the light sources is not reflected back into the light sources. The part of the infrared radiation may be at least 50% of the infrared radiation, preferably at least 80% of the infrared radiation, more preferably at least 99% of the infrared radiation, most preferably 100% of the infrared radiation. The infrared radiation filtering means may be positioned between the first lens array and the second lens array. The means for infrared radiation filtering may be a cold mirror.

The project system may be suited for projecting an illumination beam formed from multiple light beams each from a different light source and adjusted by an aperture of an aperture plate on a light valve assembly. By driving the light valve assembly a scalable version of an image is produced, that is projected onto a screen by a projection lens of the projection system.

The projection system may furthermore comprise sensors to measure the light output of at least one of the light sources. The sensors may be positioned behind the infrared radiation filtering means, e.g. cold mirrors. The cold mirrors thus may be positioned such that the light beams necessary for illumination of the set of light valves are reflected on the cold mirror, while the infrared radiation is transmitted by the cold mirror and thus does not occur anymore in the reflected light path downstream the cold mirror. Measuring the light output of at least one of said at least two light sources can be based on the infrared radiation transmitted through the cold mirror.

The projection system may comprise a driving means for each of the light sources, as well as feedback means between the sensors and the driving means of each of said light sources, to control the light output of each of said light sources. The projection system also may comprise an ultraviolet filter adjacent to each of said light sources.

The invention also relates to a projection system for projecting an image, said projection system comprising a light valve assembly, at least two light sources adjusted to each illuminate the whole light valve assembly simultaneously and an aperture means. The projection system furthermore comprises relay optics to focus said illumination onto said light valve assembly. The relay optics are positioned downstream of the aperture means in the light path. The relay optics are optimized by material choice and construction to minimize the aberrations in the pupil of the relay optics. The light valve assembly may be a deformable mirror device assembly. At least one of the at least two light sources may be an array of light emitting devices.

The projection system may be furthermore adjusted to allow rotating of the two light sources around the optical axis of the relay optics to change to which part of the illumination each of the light sources contributes. This rotation may be performed during fabrication of the projection system according to the requirements for the projection system needed.

The invention also relates to a projection system for projecting an image whereby the projection system comprises a light valve assembly, at least two light sources adjusted to each illuminate the whole light valve assembly simultaneously and an aperture means. The projection system furthermore comprises an adjustable illumination reducing means for reducing the illumination of the light valve assembly without changing the contrast.

The invention also relates to a projection system for projecting an image, whereby the projection system comprises a light valve assembly, at least two light sources adjusted to each illuminate the whole light valve assembly simultaneously, and a projection lens for projecting a scalable version of said image generated by the illuminated light valve assembly onto a surface. At least one of the at least two light sources is an array of light emitting devices. Each of said at least two light sources may be an array of light emitting devices.

The invention also may relate to a projection system for projecting a multi-color image. The projection system comprises at least two light sources adjusted to create a single illumination beam, relay optics and means for splitting said illumination beam in beams of different wavelengths or wavelength ranges, whereby the beams of different wavelengths or wavelength ranges illuminate different light valve assemblies. The projection system furthermore comprises means for reducing the amount of light of the illumination beam that is subject to a dichroic shift, whereby the dichroic shift at least partly is introduced by the means for splitting said illumination beam. The relay optics may be positioned downstream of the aperture means of the projection system. The means for reducing the amount of light of the illumination beam that is subject to a dichroic shift may comprise a means for blocking part of the illumination beam introduced at an aperture stop of the relay optics.

The invention also may relate to a projection system for projecting an image, whereby the projection system comprises a light valve assembly, at least two light sources adjusted to each illuminate the whole light valve assembly simultaneously and an aperture means.

The invention also relates to a method for using a multiple light source projection system, the method comprising the steps of driving each of said at least two light sources to create a light beam, condensing said light beams from each of said light sources in a single illumination beam, illuminating a light valve assembly with said single illumination beam, projecting said image from said illuminated light valve assembly using a projection lens. The method further comprises the step of, prior to condensing said light beams from each of said light sources, filtering infrared radiation from each light beam of each of said light sources whereby at least part of the filtered infrared radiation is not redirected into the light sources. The filtering is performed by removing at least part of the infrared radiation from the light path downstream the filtering means. The at least part of the infrared radiation may be at least 50% of the infrared radiation, preferably may be at least 80% of the infrared radiation, more preferably may be at least 99% of the infrared radiation, most preferably may be 100% of the infrared radiation. The method furthermore may comprise the steps of, after filtering and redirecting said infrared radiation, measuring the light output of each of said light sources and adjusting the driving of each of said at least two light sources accordingly as to optimise the light output of each of said light sources.

It is an advantage of the present invention to provide a projection system that combines compactness with optimized illumination.

Furthermore, it is an advantage of the present invention that it can be used both with reflective and transmissive light valves.

It is furthermore a specific advantage of the present invention that there is a lot of freedom for choosing the light sources.

It is also an advantage that the light output of the different light sources used can be controlled, such as e.g. monitored, used, adjusted, i.e. synchronized and/or optimized.

Although there has been constant improvement, change and evolution of methods and devices in this field, the present concepts are believed to represent substantial new and novel improvements, including departures from prior practices, resulting in the provision of more efficient, stable and reliable devices of this nature.

The teachings of the present invention permit the design of improved methods and apparatus for projecting images using projection display systems.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
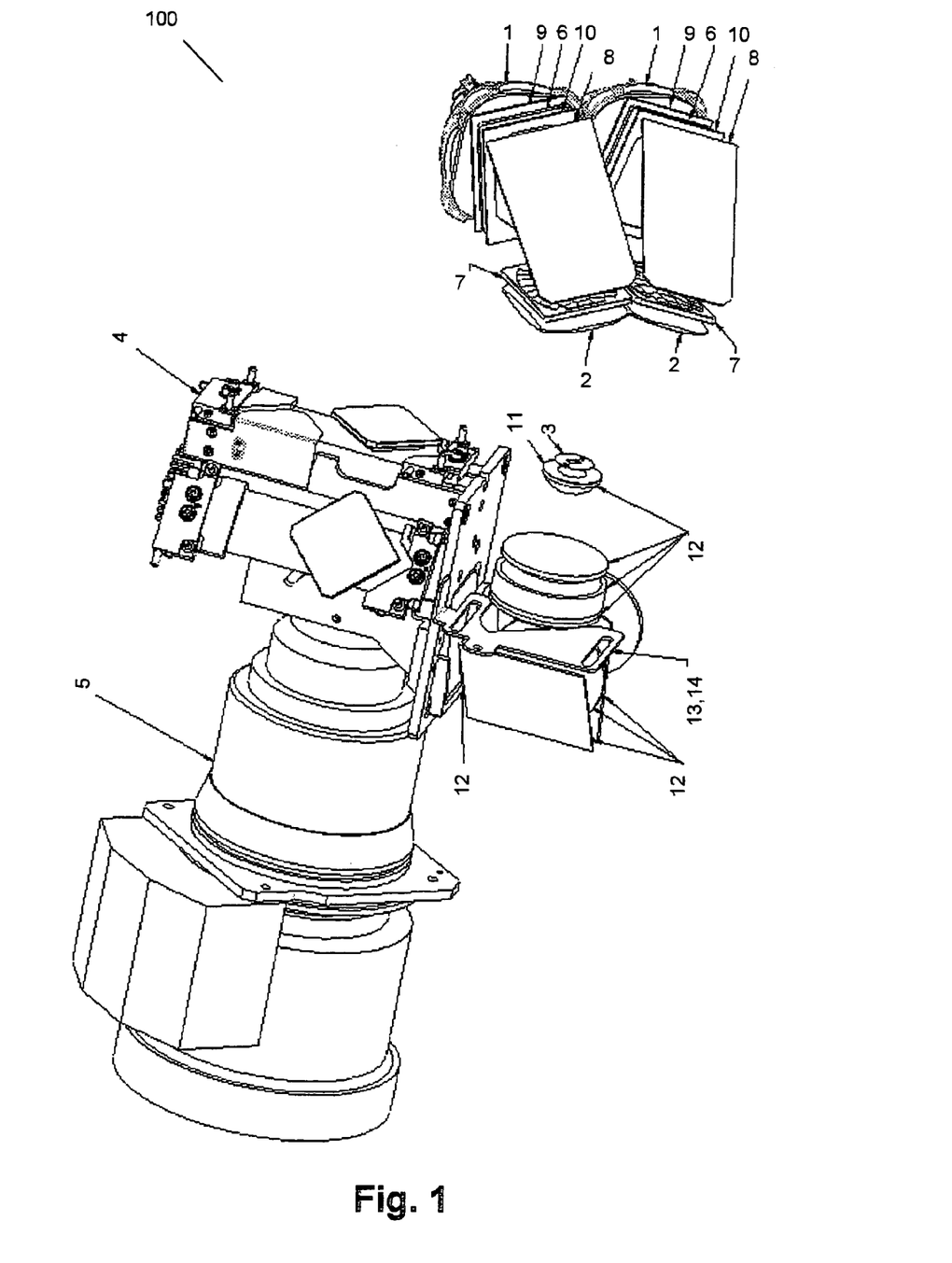
FIG. 1 is an overview of a projection system according to an embodiment of the present invention.

In a first embodiment, a projection system 100 according to the present invention is illustrated. The projection system 100 comprises at least two light sources 1, a focussing system, a condenser lens 2 or a set of condenser lenses, having a focal point where an aperture 3 is placed, a set of light valves 4, also called spatial light modulators 4 and a projection lens 5. The focussing system comprises a first lens array 6 and a second lens array 7. Whereas typically in projection systems an ultraviolet (UV)/infrared (IR) filter is used adjacent to the light source, it is a specific feature of the present invention that the projection system 100 comprises a cold mirror 8 between the first lens array 6 and the second lens array 7 to remove the IR radiation from the system. The projection system 100 according to this embodiment of the present invention does not comprise an IR filter adjacent the light sources 1 but instead comprises means for filtering or removing or diverting infrared light, which prevents infrared light emitted by the light sources from being reflected back into the light sources.

The projection system of the current embodiment optionally also may comprise a UV-filter 9 adjacent the light source 1, an adjustable dimmer 10, a diffuser 11, relay optics 12, an aperture stop of the relay optics 13 and/or a high contrast plate 14. The cold mirrors 8 allow to avoid deterioration of the light sources 1 due to IR light reflected back into the light sources 1.

Figure 2:
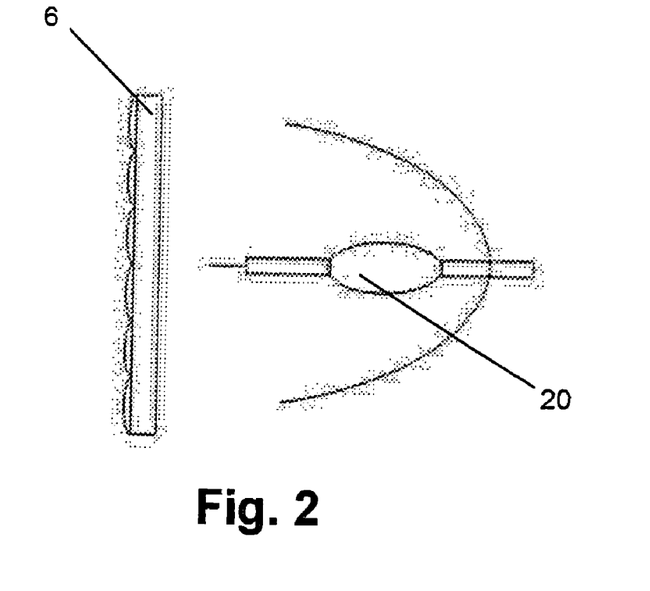
FIG. 2 is a schematic representation of part of a projection system showing a lamp illumination source and lens array position according to an embodiment of the present invention.
Figure 3:
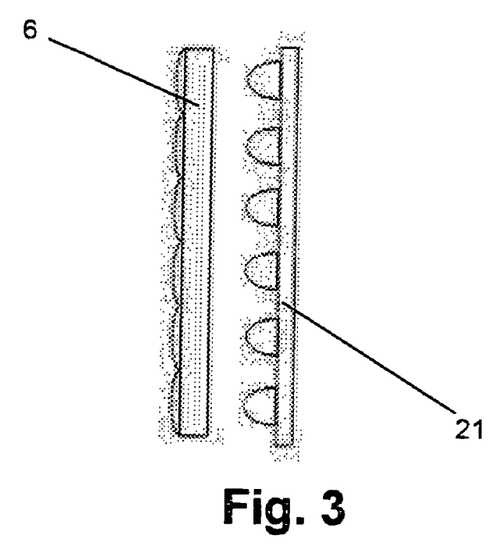
FIG. 3 is a schematic representation of part of a projection system showing a LED array illumination source and lens array position according to an embodiment of the present invention.

The light sources 1 each project a parallel bundle of light. These light sources 1 may be either lamps 20 or may be arrays of light emitting devices 21. FIG. 2 shows part of a configuration wherein lamps 20 are used. The lamps 20 used can be any conventional lamps used in a projection system, such as, but not limited to, xenon lamps, high pressure mercury lamps, halogen lamps or metal halide lamps. As the projection system of the present invention is at least a dual light source system, i.e. as the number of light sources 1 used is at least two, the total power of each lamp used can be reduced compared to single light source projection systems, to obtain the same luminous flux or the total luminous flux obtained can be higher than for single light source projection systems. The light sources 1 also may be arrays or groups of light emitting devices 21, i.e. one light source thus may correspond with an array or group of light emitting devices 21. These devices may be e.g. light emitting diodes or organic light emitting diodes. A configuration for using an array of light emitting devices is shown in FIG. 3. The latter allows the system to be more compact, which is a significant advantage.

The number of light sources 1 used may also be larger than two. Typical a number of light sources 1 is chosen so that an optimum filling of the pupil of the projection lens 5 is obtained. This can e.g. be 4 light sources arranged in a 2×2 pattern, 6 light sources arranged in a 2×3 or 3×2 pattern or 9 light sources arranged in a 3×3 pattern. Although also another number of light sources 1 can be used, the use of 2, 4, 6 or 9 light sources is preferential as this leads to the optimum filling of the pupil. So, there is a lot of freedom in choosing the light sources 1, as one starts from light sources 1 with a parallel light bundle. Lamps in a parabolic reflector may be preferred, but arrays of LED's can also be used. In case lamps are used, the shape of the reflector used can also differ from parabolic.

Each light bundle passes through a classical lens array system consisting of rectangular lenslets, in which the first lens array 6 makes images of the light source 1, which is e.g. the lamp arc, onto a second lens array 7, consisting of lenslets which typically are non-rectangular but preferably have an optimized shape to let the elongated images of the light source fit into them. Using other, not fully optimized shapes, results in a reduction of the efficiency of the system. The second lens array 7 projects an image of the first lens array 6 at infinity. A condenser lens 2 just behind the second lens array 7 brings this image to a focal point. At this focal point, there is a uniform, rectangular spot of light. Both bundles are arranged such that both rectangular spots of light coincide. The rectangular image spot, formed by the light sources 1 and the lens arrays 6, 7, need not be perfect, e.g. as caused by non-ideal lens arrays 6, 7 and the tilt of both bundles. A perfect rectangle light spot can be created by placing a rectangular aperture 3 in place to allow nothing but a perfect rectangle.

The spatial light modulators assembly may be any suitable light valve or modulator, e.g. a single-chip or 3-chip deformable mirror device (DMD) engine, a liquid crystal display (LCD) engine or a liquid crystal on silicon (LCOS) engine. It can comprise either transmissive or reflective light modulators. Transmissive devices modulate the light beam as it passes through the unit. Reflective devices modulate the light as it reflects from a mirror inside the unit. Different types of spatial light modulators can be used. Preferably, the light modulators can be addressed on a pixel-by-pixel basis to thereby represent an arbitrary image of varying greyscale. The DMD, also called digital mirror device or digital micro-mirror device, is a reflective spatial light modulator, comprising a semiconductor-based array of fast, reflective digital light switches that precisely control reflection of a light source using, for example, a binary pulse width modulation technique. A DMD has a matrix of a plurality of individually addressable and electrically deformable or moveable mirror cells. In a first state or position, each mirror cell of the deformable mirror device acts as a plane mirror to reflect the light received to one direction, through a projection lens 5 towards e.g. a projection screen (not shown in FIG. 1), while in a second state or position they project the light received to another direction, away from the projection screen (not shown in FIG. 1). In a reflective liquid crystal display (LCD) light valve, the light is not modulated by a mechanical displacement of a mirror, but by changing the polarization state of the liquid crystals in the light valve. An example of a transmissive light valve is a transmissive liquid crystal display light valve.

Typically projection systems also comprise additional filters. Whereas in conventional systems typically UV-IR filters are used, in the present invention, a separate ultraviolet (UV) filter 9 and a separate infrared (IR) filter may be used. The UV filter 9 may be positioned just behind the light source 1. This UV filter 9 typically is used in configurations having, as light sources 1, lamps 20 emitting in the UV region. This allows to protect the different components downstream the light path from being influenced by or deteriorated by the UV emission, and furthermore prevents UV emission to be emitted by the projection system 100. This emission could be both harmful and disturbing. If an array or group of light emitting devices 21 is used, these could be selected such that no UV emission is emitted, thereby avoiding the need for a UV filter 9.

As mentioned above it is an aspect of the present embodiment that, in order to filter the infrared radiation out of the light beam, cold mirrors 8 are introduced between the first lens array 6 and the second lens array 7. The infrared light thus is filtered out of, or diverted away from, the light beam coming from each of the light sources. The position of the cold mirrors 8 between the lens arrays 6,7 allows to obtain a more compact arrangement. The compactness is mainly caused by the fact that large cooling means can be avoided as, in contrast to traditional systems wherein IR light is reflected back to the light source, IR light is transmitted out of the system, or at least away from the light sources, thereby decreasing the heating and consequently also improving the aging and deterioration behavior of the light sources 1. Thus, the cold mirrors 8 used in the present invention separate the IR light and the visual light between the lens arrays 6, 7 and the IR light is easily removed from the system. Furthermore, the noise level is also reduced as smaller and consequently more quiet cooling means can be used. In other words, the use of the cold mirrors 8 gives advantages for the cooling of the light sources 1. So, in the current embodiment, infrared light emitted by a light source is not reflected back into the light source, such that the light source is not a heat sink anymore and therefore the light source suffers less aging and deterioration. However, the infrared light is still filtered from the light beam so that heating of other components downstream the light path is reduced. Furthermore, by placing the cold mirrors 8 between the first and second lens array, the optical axis of the system can make an angle, thereby reducing the size of the system as it is not necessary to put all components in a straight line. In this way the total length of the system is reduced.

Figure 4:
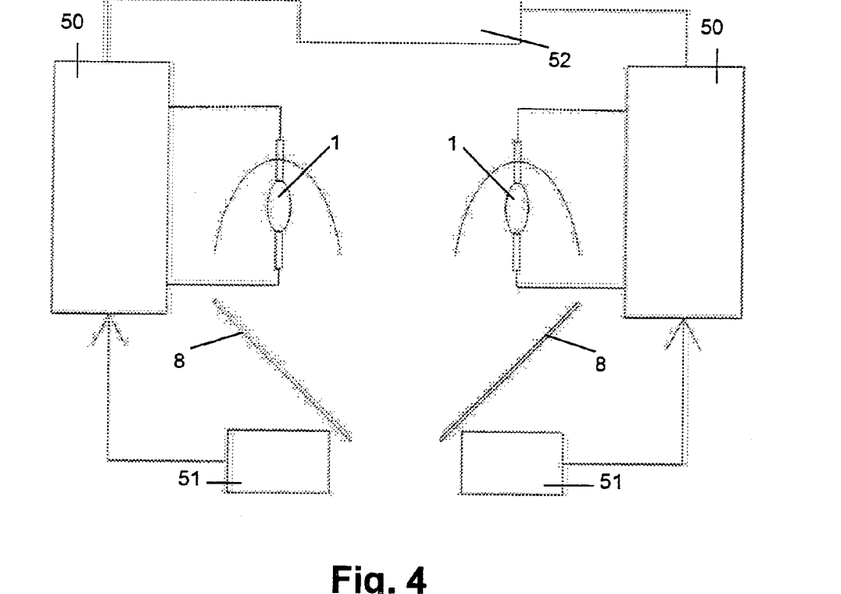
FIG. 4 is a schematic representation of a feedback loop in a projection system according to an embodiment of the present invention.

In a further embodiment a projection system 100 according to the previous embodiment is described furthermore comprising light sensors behind the cold mirrors 8, or other dichroic filters between the lens arrays 6, 7. These sensors can monitor the behavior of each lamp separately. This is illustrated in FIG. 4, wherein part of a projection system 100 according to the present invention is illustrated schematically, showing two light sources 1 with their driving means 50 and a cold mirror 8 for each of the light sources 1 having a sensor 51 at the back. This allows to provide a feedback loop from the sensors 51 to the light source driving means 50, thereby allowing to correct the created light intensity that might have changed e.g. due to aging of the light sources 1. The sensor can monitor the created light intensity by measuring the infrared radiation that is transmitted through the cold mirror 8. The infrared radiation is a measure for the light intensity created by the light source, and consequently for the light intensity coming from a specific light source that will be incident on the set of light valves 4. The light beam for illuminating the set of light valves 4 then is not disturbed as it is reflected by the cold mirror 8 and the sensors 51 are not in the light path of the projection system. The feedback supplied from the sensors 51 to the driving means 50 is used by the micro-controller 52 to optimize the driving of the light sources 1 in order to obtain an optimized light output. In case of non-pulsed lamps, this optimization may be adjustment of the power to obtain the desired light output or, in case arc discharge lamps are used, to stabilize the arc.

Figure 5:
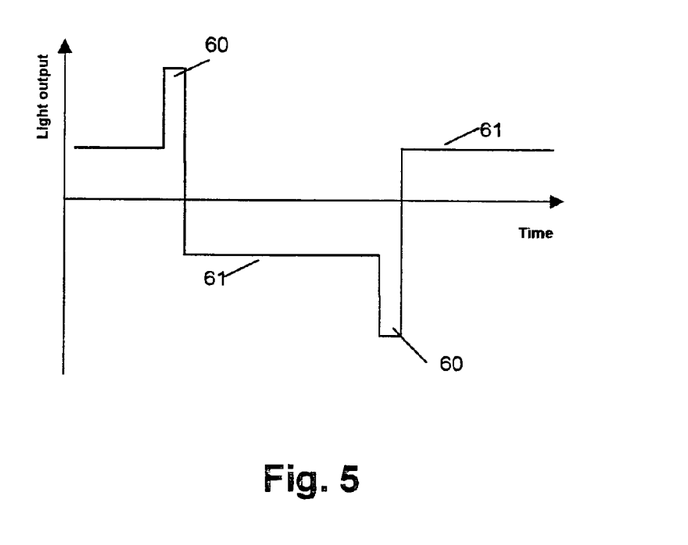
FIG. 5 is a schematic graph of the light output of a pulsed mercury lamp having a pulse-plateau behavior, used as light source in an embodiment of the present invention.

The light sources 1 used in the projection system 100 also may be pulsed light sources, e.g. pulsed mercury lamps. In this case, the sensors 51 behind the cold mirrors 8 may be used to determine the pulse-plateau ratio of the pulsed lamp. An example of a graph for light output versus time for a pulsed mercury lamp with pulses 60 and plateaus 61 is shown in FIG. 5. This light output will depend on the age and state of the mercury lamp and on the driving conditions. The measured information can then be used in a feedback loop to the drivers 50 of the light sources 1. This allows easier synchronization of the light sources 1 and/or adjustment the pulse/plateau ratio if required.

In other words, the use of light sensors behind the cold mirrors 8 gives the possibility to monitor the light sources 1, leading to information that can be used in a feedback loop to synchronize the lamps in case of AC lamps, or to adjust the power and to stabilize the arc in case of AC and DC lamps.

A specific advantage of the configuration of the projection system 100 according to the present inventions is that it allows the light sources 1 to be in horizontal position. For a lot of types of light sources 1, it is preferable that they operate in a horizontal position. A tilted position often reduces arc stability and thus lifetime.

In the following embodiments the filling of the pupil will be discussed. The latter refers to the presence of the light beams from the different light sources in or near the aperture means. Although for most applications optimally the adjustment occurs in the aperture itself, a slight deviation, e.g. obtained by placing adjustment means adjacent the aperture means also allows to obtain acceptable results. Consequently, with near the aperture means, it is meant in an area adjacent the aperture of the aperture means, wherein substantially the same properties are obtained for the light beams as in the aperture itself. Describing the filling of the aperture therefore includes describing the filling of a corresponding area near the aperture means. With filling it is meant how the cross-sections of the incident light beams are positioned and how large their surface area is, with respect to the area of the aperture or with respect to the corresponding area near the aperture means.

The invention also relates to a third embodiment, describing a projection system comprising at least two light sources 1, a focussing system, a condenser lens 2 or a set of condenser lenses, having a focal point where an aperture is placed 3, a set of light valves 4, also called spatial light modulators 4, a projection lens 5 and additionally relay optics 12 positioned downstream of the aperture of the aperture plate 3 on the light path to sharply image the light bundle on the set of light valves 4. Reference is again made to FIG. 1. This allows to optimize the illumination of the set of light valves 4. Furthermore an aperture stop of the relay optics 12 may be provided. As in the previous description, the focussing system typically comprises a first lens array 6 and a second lens array 7. So, in the projection system of the current embodiment, a light beam is created in at least two light sources 1, the light beams are focussed using lens arrays, the light beams then are condensed to a single illumination beam, of which the shape is defined by an aperture of an aperture plate 3 and the light beam is then focussed on a set of light valves 4 using relay optics 12, which can be chosen as to optimally focus the illumination beam onto the set of light valves. A scalable version of the image to be projected is then created by driving the set of light valves 4 accordingly and this scalable version of the image is then projected using the projection lens 5 onto a screen. It is a specific feature of the current embodiment that the focussing lenslet array system is combined with additional relay optics 12 positioned downstream the aperture on the light path, i.e. between the aperture and the set of light valves 4. This allows to improve the illumination of the light valves 4 and furthermore also allows to introduce novel features to improve contrast and/or brightness in a compact multiple light source projection system.

The projection system of the current embodiment optionally also may comprise further components such as a UV/IR filter near the light sources 1 or alternatively a UV-filter 9 adjacent the light source 1 and a cold mirror 8 between the first and second lens array of the focussing system according to the previous embodiment, an adjustable dimmer 10, a diffuser 11 and/or a high contrast plate 14.

The light sources 1 each project a parallel bundle of light. These light sources 1 may be either lamps or may be arrays of light emitting devices. The lamps used can be any conventional lamps used in a projection system, such as, but not limited to, xenon lamps, high pressure mercury lamps, halogen lamps or metal halide lamps. The increased number of light sources 1 allows to reduce the total power of each light source used or to increase the total power obtained in the projection system, compared to a single light source system. The light sources 1 also may be arrays of light emitting devices, i.e. one light source thus may correspond with an array of light emitting devices. These devices may be e.g. light emitting diodes or organic light emitting diodes. The latter allows the system to be more compact, which is a significant advantage.

The number of light sources 1 used may be 2 light sources, 4 light sources arranged in a 2×2 pattern, 6 light sources arranged in a 2×3 or 3×2 pattern or 9 light sources arranged in a 3×3 pattern. Although also other numbers of light sources can be used, the use of 2, 4, 6 or 9 light sources is preferential as this leads to the optimum filling of the pupil.

Each bundle passes through a classical lens array system consisting of rectangular lenslets, in which the first lens array 6 makes images of the light source 1, which is e.g. the lamp arc, onto a second lens array 7, consisting of lenslets which typically are non-rectangular but have an optimized shape to let the elongated images of the light source fit into them. If other, not fully optimized shapes are used, the efficiency of the system will be lower. The second lens array 7 projects an image of the first lens array 6 at infinity. A condenser lens 2 just behind the second lens array 7 brings this image to a focal point. At this focal point, there is a uniform, rectangular spot of light. Both bundles are arranged such that both rectangular spots of light coincide. The rectangular image spot, formed by the light sources 1 and the lens arrays 6, 7, will not be perfect, because of non-ideal lens arrays 6, 7 and the tilt of both bundles. A perfect rectangle light spot is created by placing a rectangular aperture 3 in place to allow nothing but a perfect rectangle.

The spatial light modulators assembly may be any suitable light valve or spatial light modulator, e.g. a single-chip or 3-chip deformable mirror device (DMD) engine, a liquid crystal display (LCD) engine or an liquid crystal on silicon (LCOS) engine. It can either be transmissive or reflective light modulators. Transmissive devices modulate the light beam as it passes through the unit. Reflective devices modulate the light as it reflects from a mirror inside the unit. So, different types of spatial light modulators can be used e.g. DMDs, also called digital mirror devices or digital micro-mirror devices, reflective liquid crystal display (LCD) light valves, transmissive liquid crystal display light valves. These components have a similar description as the descriptions given in the previous embodiments.

The relay optics 12, which is a characterizing feature of the current embodiment of the invention images the rectangular light spot obtained from the aperture of the aperture plate 3 onto a spatial light modulators assembly comprising spatial light modulators 4. The relay optics thus are positioned downstream the aperture of the aperture plate 3 on the light path. The relay optics typically is telecentric on both sides and comprises a number of lenses, e.g. 4 or 6 lenses. This additional optics, for which the materials can be optimally chosen, e.g. by choosing different types of glass, and for which the construction can be optimized, allows that little pupil aberrations are present. Because the relay optics 12 can have less aberrations than a system of lens arrays, the illumination of the spatial light modulators 4 is sharper defined than without relay optics 12. In other words, instead of directly projecting the image of the lens arrays on the light valves 4, relay optics 12 is added which allows improved illumination of the light valves 4.

Figure 6:
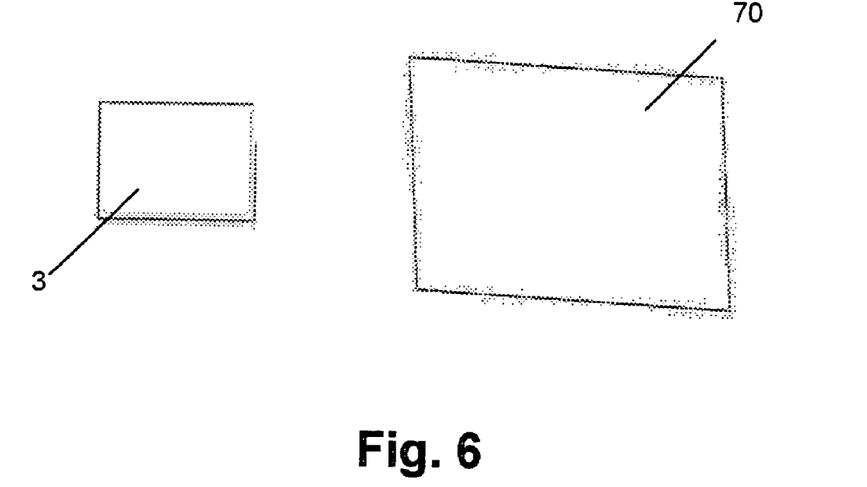
FIG. 6 is a schematic representation of a rectangular aperture and the corresponding image due to the Scheimpflug effect according to an embodiment of the present invention.
Figure 7:
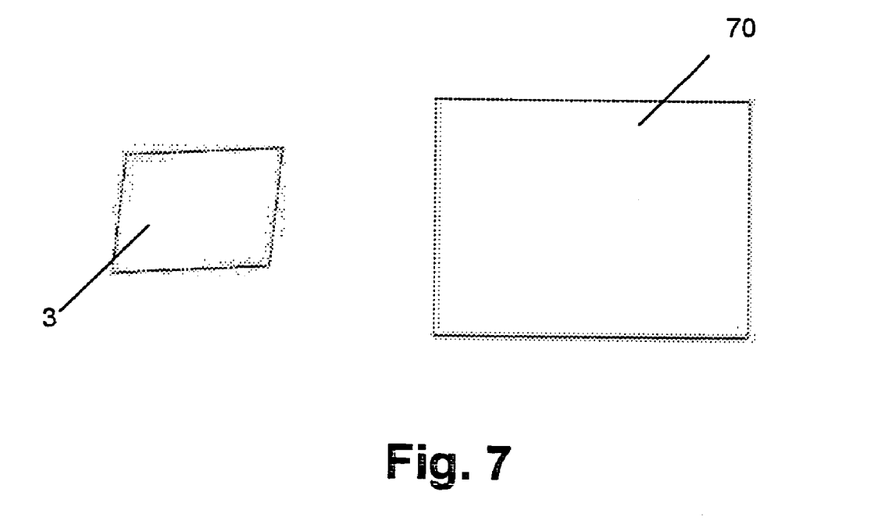
FIG. 7 is a schematic representation of a tilted aperture appearing as a parallelogram and the corresponding image due to the Scheimpflug effect according to an embodiment of the present invention.

Optionally, in the case of use of DMD's as light valves, embodiment 3 may be adjusted with an adjustment means comprising a tilting means so that the aperture 3 can be tilted according to the laws of Scheimpflug, i.e. to compensate for the tilt of the light valve with respect to the optical axis of the relay optics 12. When tilted, the optimal shape of the aperture 3 is not rectangular, but a slight parallelogram. This is illustrated in FIG. 6 and FIG. 7. FIG. 6 shows the image at the DMD 70 being a parallelogram if the aperture 3 is rectangular. FIG. 7 shows the image at the DMD 70 being rectangular if the aperture 3 appears as a parallelogram for the bundle, i.e. by tilting the aperture. Thus, in this way, by tilting the aperture compensation for Scheimpflug effects is obtained.

Thus, in the current embodiment according to the present invention, the illumination of the light valve is defined more sharp. This improves light output and reduced heat load of the light valve. This is especially important for reflective light valves, because these cannot be shielded easily.

Figure 8:
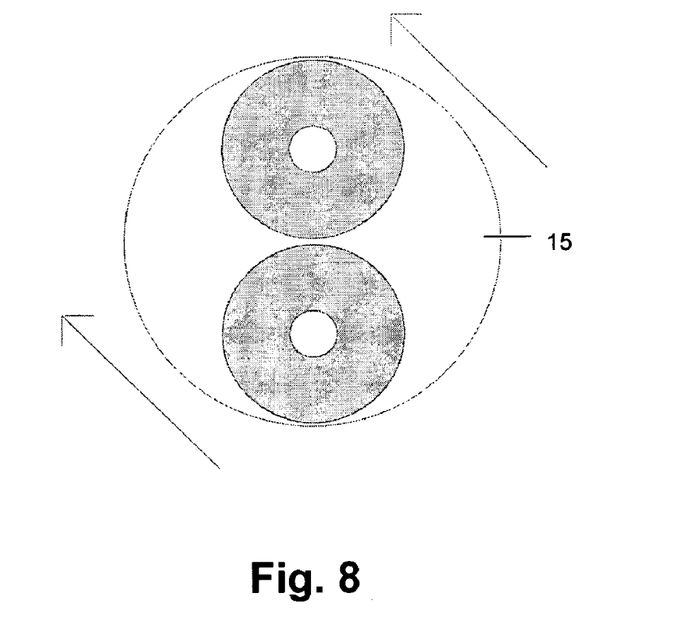
FIG. 8 shows the filling of the pupil in an embodiment according to an embodiment of the present invention.
Figure 9:
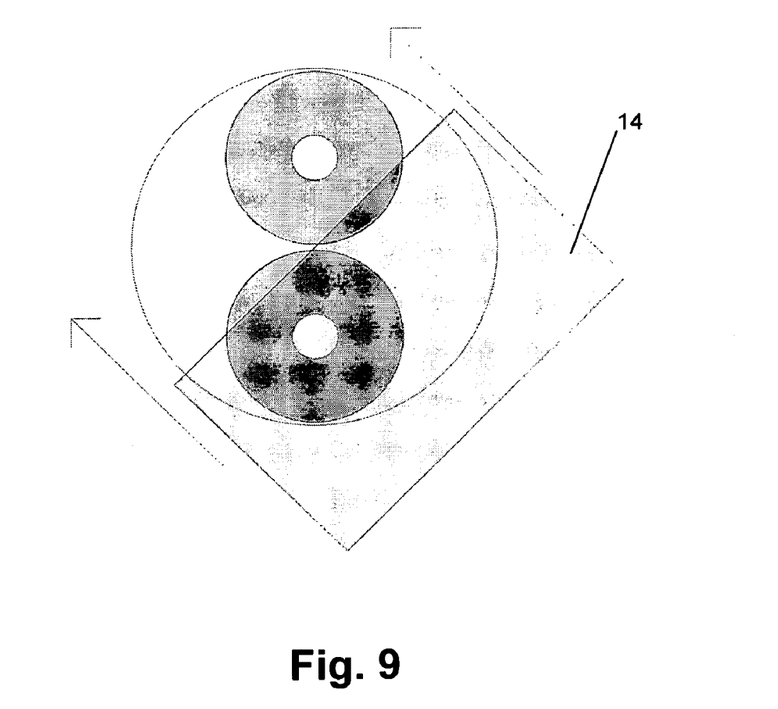
FIG. 9 shows the filling of the pupil and the use of a contrast enhancer according to an embodiment of the present invention.

In a further embodiment, according to any of the embodiments 1 to 3 of the present invention comprising relay optics 12 and an aperture stop of the relay optics 13, the projection system is furthermore adjusted with an adjustment means to allow to improve the contrast, while keeping sacrificed light output as low as possible. In this way, the contrast can be doubled by e.g. sacrificing only half of the light output. This can be done by using an adjustment means, which may be a blocking means such as a high contrast plate 14 which can be inserted as illustrated in FIG. 1 at the aperture stop of the relay optics 13. This high contrast plate 14 can be made of any material that allows to block the light, such as—but not limited to—e.g. a metal plate. The high contrast plate 14 is inserted such that the rays with the smallest incident angles on the light valves 4 are blocked. This is shown in FIG. 8 and FIG. 9. In FIG. 8 a filled pupil 15 is shown. All light rays passing through a certain point in the pupil hit the light valve with the same angle of incidence. The more the point is situated in the upper left of the pupil, the higher the angle of incidence is on the light valve for the light rays passing through that point. In FIG. 9, a high contrast plate 14 blocking the lower right part of the pupil, i.e. the points corresponding with light rays having a low angle of incidence on the light valve 4. By blocking the light rays, the contrast of the image is enhanced, while the sacrifice of light output is only limited. The contrast enhancement is based on the following principle: the rays with the lowest angle of incidence on the light valves 4 will, after reflection on the light valves 4 in the OFF state, pass closest to the entrance pupil of the projection lens. As there is always some scattering on optical surfaces, these rays have the highest possibility to pass through the entrance pupil of the projection lens and thus to reach the screen, where they lower the contrast as the rays are transmitted although the light valve is in the OFF state. Although the high contrast plate 14 as shown in FIG. 9 is shown having a straight edge, a high contrast plate 14 having a curved edge can also be implemented. The light output/contrast ratio can be improved using high contrast plates 14 having different edges, depending on the filling of the pupil.

Figure 10:
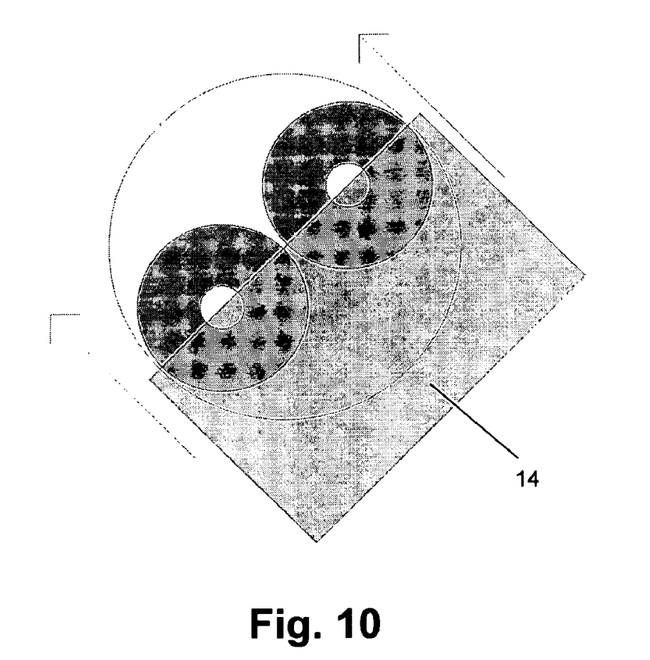
FIG. 10 shows a schematic representation of the filling of the pupil with two light sources having the same average angle of incidence on the light valve, according to an embodiment of the present invention.
Figure 11:
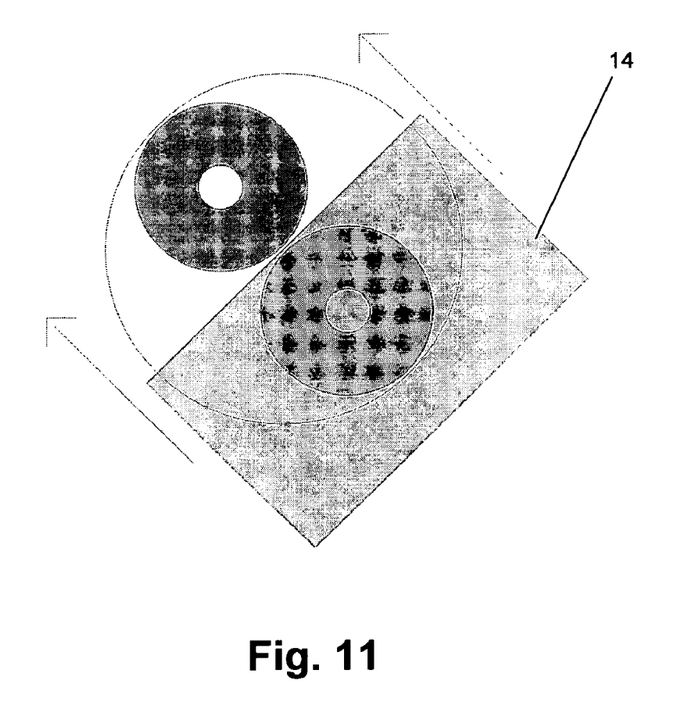
FIG. 11 shows a schematic representation of the filling of the pupil with a first light source having a high angle of incidence on the light valve and a second light source having a low angle of incidence on the light valve, according to an embodiment of the present invention.

In another embodiment, relating to a modification of any of the embodiments 1 to 3 of the present invention that comprise relay optics 12 and an aperture stop of the relay optics 13, a projection system is described furthermore adjusted with an adjustment means being a rotating means to be able to rotate the assembly of light sources 1 and the corresponding optical components such as lens arrays, filters, mirrors, fly eyes around the optical axis of the relay optics 12. It is to be understood that the different optical components all need to be adjusted in the same way. This rotation allows to obtain the image of the different light sources 1 on different positions in the pupil. FIG. 10 illustrates the situation wherein two light sources 1 have the same average angle of incidence on the light valve, i.e. wherein both light sources 1 have the same contrast. Alternatively, the light sources 1 and the corresponding optical components can be rotated around the optical axis of the relay optics 12 so that one light source corresponds with high angles of incidence on the light valve 4, while another light source corresponds with low angles of incidence on the light valve 4. In this case, the image of the one light source is situated in the upper left corner of the pupil, while the image of the other light source is situated in the lower right corner of the pupil. The contrast of the projection system can then be changed e.g. by shutting off the light source corresponding with the lowest angles of incidence, whereby contrast is gained, but half of the light output is sacrificed. This is illustrated in FIG. 11. If a basic contrast enhancer based on inserting a plate 14 is present, then, for a fixed position of plate 14, the contrast can be changed by rotating the light sources 1 and the corresponding optical components around the optical axis of the relay optics 12, while the change in light output is limited further. If plate 14 blocks half of the pupil, the contrast of the projection system can be changed by rotating the light sources 1 and the corresponding optical components, without influencing the amount of light output. The orientation of the lamps is chosen during the design phase, and an appropriate design of the lens array is needed.

Figure 12:
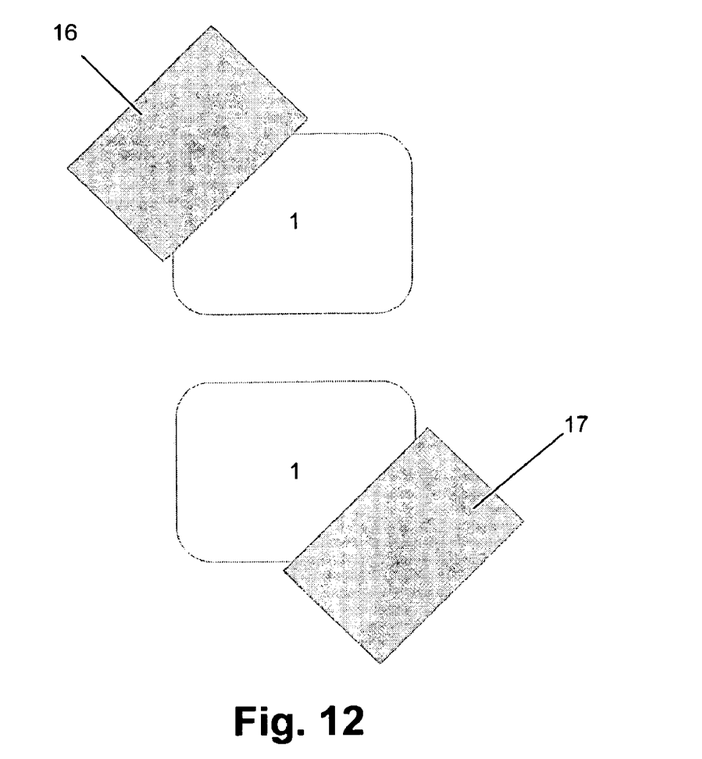
FIG. 12 shows a schematic representation of the blocking of the light sources by symmetric plates according to an embodiment of the present invention.
Figure 13:
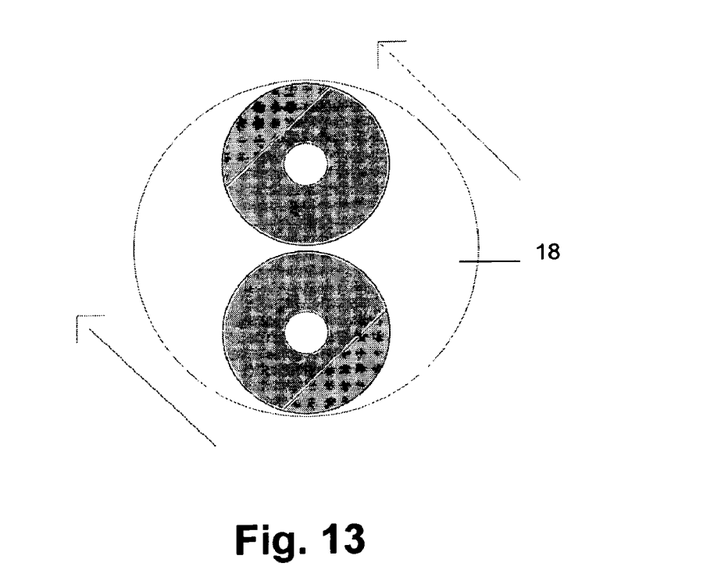
FIG. 13 shows the filling of the pupil if blocking of the light sources is performed using two symmetric plates, as shown in FIG. 12.

In a further embodiment of the invention, a projection system according to any of the previous embodiments can be further adjusted using an adjustment means being an adjustable illumination reducing means so that the image created can be dimmed to lower intensities, i.e. so that the light output can be adjusted. It is a specific advantage of the present invention that the dimming can be performed without changing the contrast. This is useful for projectors in multi-screen applications, where a uniform white and black level is required across the projectors. This can be achieved by using an adjustable illumination reducing means, also referred to as adjustable dimmer 10, comprising for each of the light sources 1 a plate, which is non-transparent for the light of the light sources 1 used. The plate can be—but are not limited to—metal plates. In use of the adjustable illumination reducing means, i.e. the adjustable dimmer 10, the non-transparent plates are shifted right before or after the first lens array, as illustrated in FIG. 12, as to symmetrically cover equal portions of the different light sources 1. This allows to keep the average incidence angle on the light valve unchanged which leads to the contrast being constant. The corresponding filling of the pupil 18 is shown in FIG. 13.

Figure 14:
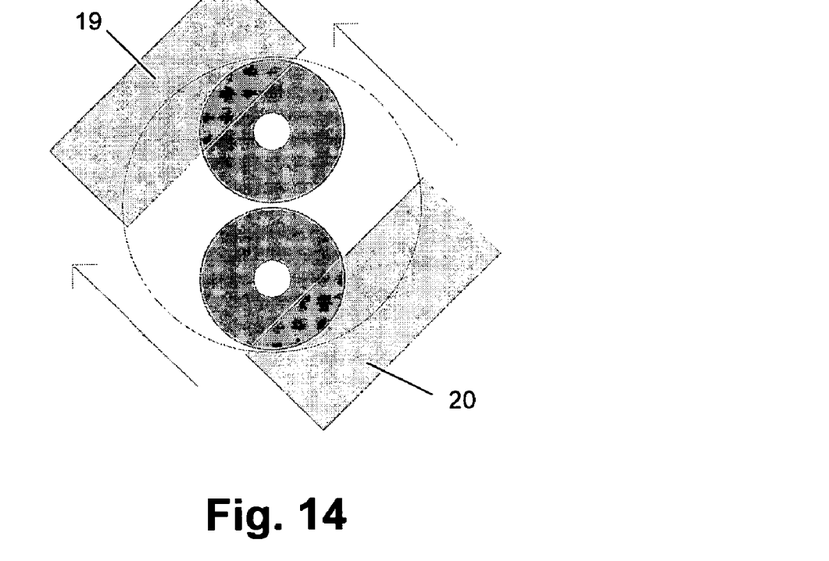
FIG. 14 shows the blocking of the illumination beam using two symmetric plates at the aperture stop of the relay optics, according to an embodiment of the present invention.

This can also be achieved for an adjustable dimmer 10, whereby the symmetric plates 19, 20 are positioned symmetrically at the aperture 3, as illustrated in FIG. 14.

Figure 15:
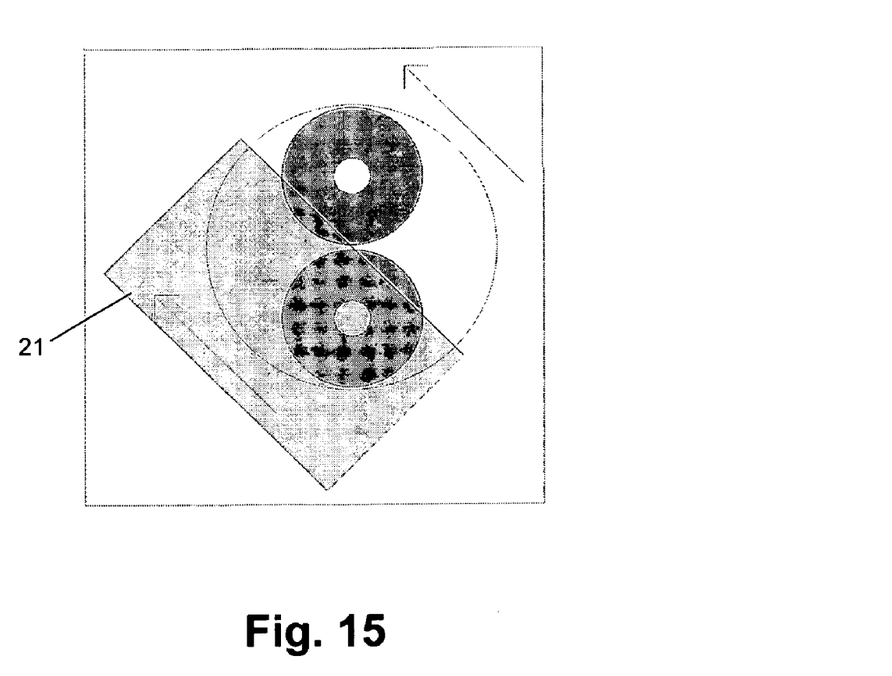
FIG. 15 shows the blocking of the illumination beam using a single plate at the aperture stop of the relay optics, according to an embodiment of the present invention.

Alternatively, for projection systems comprising relay optics 12, one plate 21 can also be inserted at the aperture stop of the relay optics 13, but at right angles to the high contrast plate. In this way, the light output is adjusted without influencing the contrast, using only one plate. This is shown in FIG. 15. In this way, light is blocked, thereby adjusting the light output, whereas the average incidence angle on the light valves 4 is unchanged. The latter allows to leave the contrast not influenced.

Figure 16:
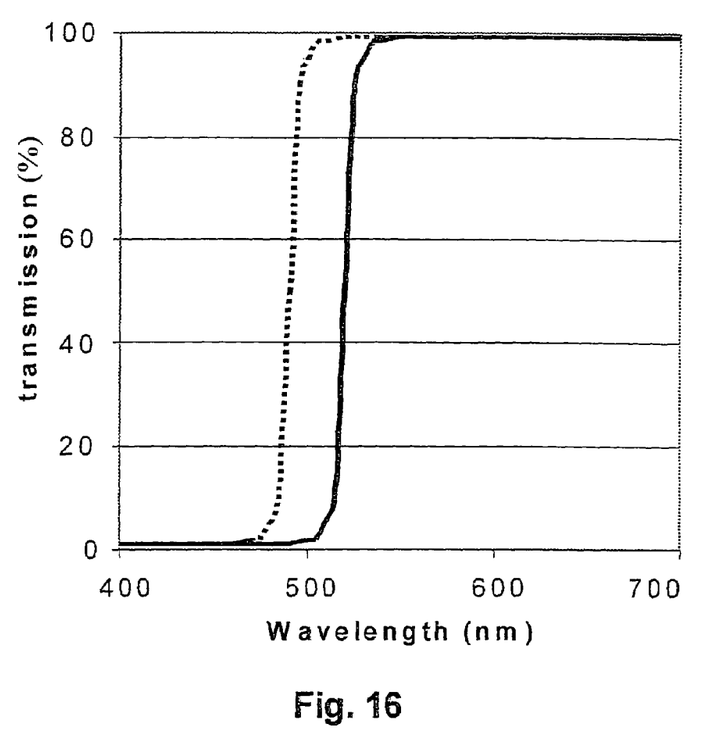
FIG. 16 is a graph of the transmission of light by a dichroic coating as a function of the wavelength for different angles of incidence.

In another embodiment according to the present invention, the projection system is further equipped with an adjustment means, being a blocking means which is a system to control the dichroic shift light. The problem of "dichroic shift light" in the color prism is well known in color projection systems, such as—but not limited to—e.g. 3-chip digital mirror devices projectors. This is caused by the dichroic coatings, which are used for separating and combining three colors, typically the tree basic colors red, green and blue, and which have a typical angle dependence, i.e. the reflection and transmission properties are not only wavelength dependent, but also depend on the angle of incidence. As the incoming bundle of light, which is separated in a set of basic colors, has a certain angle of incidence on the light valve 4 determined by the tilting angle of the light valve 4, and as the exiting bundle, which is to be recombined, is at right angles to the light valve, both bundles have different angles of incidence on the dichroic coatings. The characteristics of the dichroic coatings thus are different for both bundles. A graph of this dichroic shift is shown in FIG. 16. The full line represents the transmission of a typical dichroic coating for light having an angle of incidence of 0°, whereas the dotted line represents the transmission of a typical dichroic coating for light having an angle of incidence larger than 0°.

The problem arises when light, which reflects on a dichroic coating during the separation process, does not reflect on this coating during the recombination process, but instead is transmitted. Alternatively, it also arises in the complementary situation, when light, which is transmitted by a dichroic coating during the separation process is reflected by this coating during the recombination process. Which parts of the bundles and which wavelengths of the incoming light will undergo the dichroic shift can be determined experimentally or theoretically. The corresponding light then can be blocked selectively by using plates in the aperture stop 13, which block the appropriate part of the bundle, and/or dichroic color filters in a preferably telecentric part of the relay optics 12 that block the appropriate wavelengths in the bundle. By rotating the light sources 1 as shown in FIG. 10 and FIG. 11, the amount of light that will undergo the dichroic shift can also be reduced.

Figure 17:
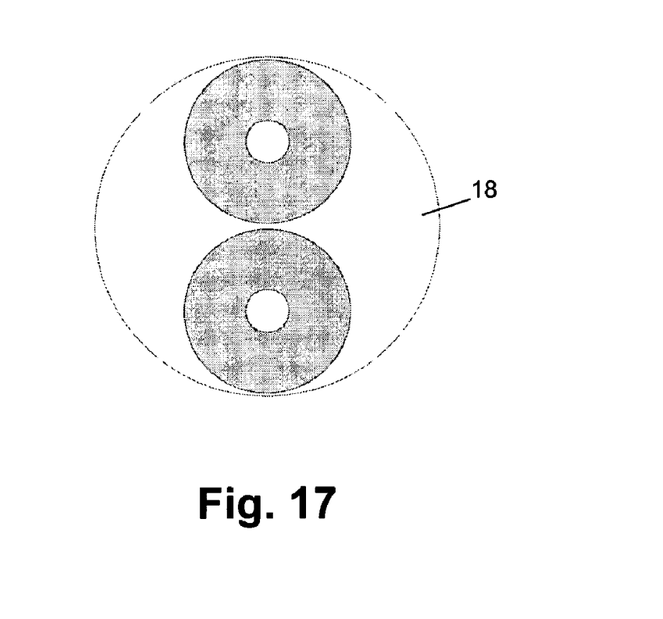
FIG. 17 shows the filling of the pupil for a projection system having no diffuser.
Figure 18:
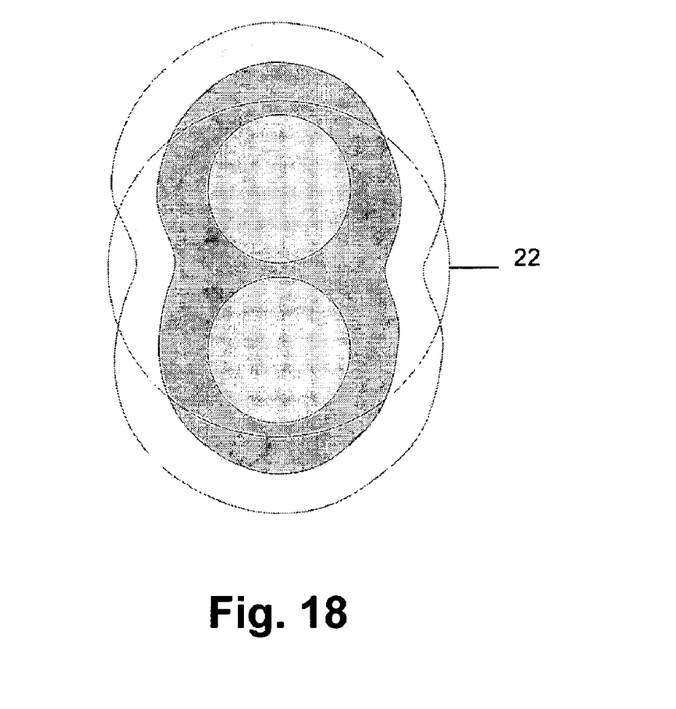
FIG. 18 shows the filling of the pupil for an embodiment having a diffuser according to an embodiment of the present invention.

In a specific embodiment of the present invention, a projection system is described that comprises an adjustment means comprising a diffuser such that the system is adjusted to allow obtaining a more uniform filling of the aperture. This filling of the aperture can be made more uniform by the addition of a diffuser 11, e.g. a diffuser glass, as can be seen from FIG. 17 and FIG. 18. The diffuser typically is made of glass that is treated with a sandblast. Depending on the projection system, also glasses with special coatings could be used, provided the coating is sufficiently heat resistant. As the transparency is reduced for increasing diffuser strength, a compromise should be found between sufficient transparency and sufficient diffusing of the light, depending on the specific applications of the projector system. FIG. 17 shows the pupil 18 for a dual light source system in a projection system having no diffuser 11, whereas FIG. 18 shows a dual light source system in a projection system with a diffuser 11. It can be implemented at small distance behind the rectangular aperture, but preferably not exactly at the rectangular aperture, because dust that adheres to the diffuser glass would then be imaged onto the light valve. So, by using the diffuser 11, the filing of the pupil 22 is improved. A more uniform filling of the pupil is desirable and advantageous, because it makes the control of the projected image as described in the embodiments according to the present invention easier. On the other hand, a sacrifice in light output will have to be made. The additional features described in the above embodiments allow to have more control over the characteristics of the projected image. The contrast and brightness can be independently adjusted. This is important for multi-screen applications, where different projectors must have the same characteristics.

A further advantage of the invention is that two separate lamps are used, which does not only allow to control both light sources 1 separately but also allows replacement of one of the light sources 1.

Combined with means for image processing and with a memory component, the projection system forms a digital light processing system capable of projecting large, bright, seamless, high-contrast color images.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A projection system for projecting an image, said projection system comprising a light valve assembly, at least two light sources and an aperture means common to said at least two light sources, said at least two light sources adapted to each simultaneously illuminate the whole light valve assembly by emitting an illumination beam towards said aperture means, wherein said system comprises an adjustment means for adjusting, in or near the aperture means, a cross-section of said illumination beam of at least one of said light sources, and whereby, at the position of the adjusting means, and for each of the said at least two light sources, said cross-section does not overlap with cross-sections of illumination beams of other of said light sources.

2. A projection system according to claim 1, wherein said adjustment means is arranged to adjust a cross-section in or near the aperture means by changing the ratio of the area of the projections of the cross-sections of the illumination beams projected perpendicular to the average plane through an aperture of said aperture means to the area of said aperture of said aperture means.

3. A projection system according to claim 1, wherein said adjustment means is arranged to adjust a cross-section in or near the aperture means by tilting said aperture means with respect to the optical axis of said system, so as to correct for a Scheimpflug effect of an image created at the light valve assembly.

4. A projection system according to claim 1 wherein said adjustment means comprises a blocking means for blocking at least part of the cross-section of the illumination beam of at least one of said light sources.

5. A projection system according to claim 4, wherein said blocking means is a high contrast plate.

6. A projection system according to claims 4, wherein said blocked part is the part of the illumination beam with illumination rays having the smallest incident angles on the light valve assembly.

7. A projection system according to claim 1, wherein said adjustment means comprises an adjustable illumination reducing means for reducing the illumination of the light valve assembly without changing the contrast.

8. A projection system according to claim 7, wherein said adjustable illumination reducing means enables blocking of at least part of the illumination beam in or near the aperture means such that the average angle of incidence of illumination rays that reach the light valve assembly is substantially equal to the average angle of incidence of illumination rays that reach the light valve assembly without blocking part of the illumination.

9. A projection system according to claim 8, wherein said blocked part of the illumination beam is such that equal portions of illumination rays with high angle of incidence on the light valve assembly and illumination rays with low angle of incidence on the light valve assembly are blocked.

10. A projection system according to claim 1, wherein said projection system furthermore comprises splitting means for splitting said illumination beams in beams of different wavelength ranges, said beams of different wavelength ranges adapted for illuminating different light valve assemblies, wherein said adjustment means comprises means for reducing the amount of light of the illumination beam that is subject to a dichroic shift, said dichroic shift introduced by said means for splitting said illumination beams.

11. A projection system according to claim 10, wherein said means for reducing the amount of light of the illumination beams that are subject to a dichroic shift comprises a means for blocking, in or near the aperture means, part of the illumination.

12. A projection system according to claim 1, wherein said adjustment means comprises a rotating means for rotating said at least two light sources around the optical axis of said system.

13. A projection system according to claim 1, wherein said means for adjusting comprises a diffuser, positioned close to but not at the aperture means.

14. A method for using a multiple light source projection system, said method comprising driving each of at least two light sources to create a light beam, condensing said light beams from each of said light sources in a single illumination beam, illuminating a light valve assembly with said single illumination beam, wherein said method further comprises, prior to illuminating a light valve assembly with said single illumination beam adjusting in or near an aperture means which is common to the light beams of said at least two light sources, a cross-section of said light beams of at least one of said light sources whereby the adjusting is done in an area in or near said aperture means where, for each of said at least two light sources, said cross-section does not overlap with cross-sections of illumination beams of other of said light sources.

15. A method according to claim 14, wherein adjusting said cross-section of said light beams of at least one of said light sources comprises tilting said aperture means with respect to the optical axis of said system, so as to correct for a Scheimpflug effect of an image created at the light valve assembly.

16. A method according to claim 14, wherein adjusting said cross-section of said light beams of at least one of said light sources comprises blocking at least part of the cross-section of the light beam of at least one of said light sources.

17. A method according to claim 16, wherein said blocking at least part of the cross-section of the light beam of at least one of said light sources comprises blocking said part of the light beam(s) comprising illumination rays having the smallest incident angles on the light valve assembly.

18. A method according to claim 16, said blocking at least part of the cross-section of the light beam of at least one of said light sources comprises blocking said part of the light beam(s) without changing the contrast.

19. A method according to claim 16, wherein said blocking at least part of the cross-section of the light beam of at least one of said light sources comprises blocking part of the light beam(s) that is subject to a dichroic shift.

20. A method according to claim 14, wherein adjusting in or near an aperture means a cross-section of said light beams of at least one of said light sources comprises rotating said at least two light sources around the optical axis of said system.

21. A method according to claim 14, wherein adjusting in or near an aperture means a cross-section of said light beams of at least one of said light sources comprises diffusing at least part of a light beam of at least one of said light sources.

22. A method according to claim 14, said method further comprising projecting said image from said illuminated light valve assembly using a projection lens.

* * * * *